United States Patent [19]

Joseph et al.

[11] Patent Number: 4,488,860
[45] Date of Patent: Dec. 18, 1984

[54] METHOD AND APPARATUS FOR PRODUCING MULTI-LAYER EXPANDED FILMS

[75] Inventors: Stephen H. Joseph, London; John E. Miller, Leigh-on-Sea; Lawrie A. Williamson, Colchester, all of England

[73] Assignee: National Research Development Corporation, London, England

[21] Appl. No.: 462,922

[22] Filed: Feb. 1, 1983

Related U.S. Application Data

[62] Division of Ser. No. 276,252, Jun. 22, 1981, Pat. No. 4,383,968.

[30] Foreign Application Priority Data

Jun. 20, 1980 [GB] United Kingdom ............... 8020314

[51] Int. Cl.³ .............................................. A21C 3/00
[52] U.S. Cl. ........................... 425/131.1; 156/244.14; 425/94; 425/97; 425/326.1
[58] Field of Search ............... 425/94, 97, 106, 133.1, 425/131.1, 326.1; 156/244.14, 500

[56] References Cited

U.S. PATENT DOCUMENTS

| | | | |
|---|---|---|---|
| 2,597,553 | 5/1952 | Weber | 425/97 |
| 2,987,776 | 6/1961 | Miller et al. | 264/562 |
| 3,160,917 | 12/1964 | Berggren et al. | 425/106 |
| 3,709,642 | 1/1973 | Stannard | 425/133.1 |
| 3,957,566 | 5/1976 | Rahlfs | 425/133.1 |
| 4,248,576 | 2/1981 | Birks et al. | 425/326.1 |
| 4,357,191 | 2/1982 | Bullard et al. | 156/244.14 |

Primary Examiner—Lorenzo B. Hayes
Assistant Examiner—W. Thompson
Attorney, Agent, or Firm—Cushman, Darby & Cushman

[57] ABSTRACT

Method and apparatus for forming multi-layer expanded film. A base film extruded by a die (6) is coated, immediately downstream of the die mouth (5), by a further layer of fluid propelled from a manifold (16) through a metering orifice (19). The combination of manifold and metering orifice is necessary to permit accurate control of the flow rate of the fluid and hence of the thickness of the coating, and the mouth of the die and the metering orifice must be very close so that the base film is as resistant as possible to deflection by the impact of the coating fluid, and so that contact takes place before any substantial expansion has taken place. The downstream end of the resulting multi-layer tubular film is then held closed in known fashion and the closed tube is expanded by air under pressure admitted by an opening (7) in the die (6).

10 Claims, 6 Drawing Figures

METHOD AND APPARATUS FOR PRODUCING MULTI-LAYER EXPANDED FILMS

This is a division of application Ser. No. 276,252, filed June 22, 1981 U.S. Pat. No. 4,383,968.

This invention relates to multi-layer expanded films, particularly such films as are used extensively for the wrapping of food and other retail products. Such films typically comprise a relatively inexpensive base film—of polythene, for example—and a surface layer of more expensive plastic, for example polyisobutylene. Such films are essentially very thin, and a well-tried method of making them comprises two stages. In the first of these stages a film comprising two layers—base and surface—is produced in tubular form by an extrusion process. The second stage comprises closing the end of the tube remote from the extruder—for instance by means of the nip of drawing-off rollers through which the film subsequently passes—cooling the tube, and filling the tube so enclosed with a bubble of gas under pressure so that the walls yield, thus expanding in area and diminishing in thickness. It has been found that such processes can be controlled so that the base and surface layer thicknesses reduce generally in proportion to each other.

One disadvantage of such methods for producing a two-layer film—and indeed of similar known processes for producing films with more than two layers—concerns the first stage of the process. According to the current practice, this stage is usually effected by a co-extrusion die set in which separate melts pass through separate forming channels, then coalesce at elevated pressure, and then pass through a final orifice to form a layered but single, compound mass. Typically, tubular coaxial melts coalesce into a single compound tube to which the second, expansion stage of the process is applied. Such co-extrusion machines, with two or more channels each connected to a different extruder and material supply, are complicated and expensive.

Processes have also been proposed in which a base layer is extruded and a surface layer then applied to it by a coating technique. Such processes, of which examples are to be found in UK Specification No. 936,535 and U.S. Pat. No. 2,848,747, offer the potential advantage of cheapness over such processes as those already described in which the surface and base layers are co-extruded. However, these two published specifications also illustrate typical disadvantages of the known "coating-type" processes that they represent. Thus U.K. No. 936,535 describes processes in which a tubular extruded base layer moves in wiping contact past standing masses of the coating material, the masses being of considerable depth when measured in a direction parallel to the axis of the extruded tube so that the wiping contact is maintained over that considerable axial distance also. In FIG. 5 of U.K. No. 936,535 both the axial and the radial depth of the mass that imparts coating material on to the inner surface 60 of the tube 16 is such that the positive scraping action of a doctor blade 54, located at the downstream end of the mass, is necessary to shave the imparted coating to acceptably even thickness. If the tube with its imparted coating were here to bear against any surface less sharp than a scraping blade, then the axial distance between the point of bearing contact and the surface 58 of the die is so great that the tubing 16 will already be quite unsupported in a direction normal to the axis of extrusion, so that the contact between the tubing and the body bearing against it would tend simply to cause the tube to yield and distort rather then to exercise any evening effect upon the thickness of the imparted coating. The tubing will of course be even less supported when it passes the secondary die 20, with even worse consequences for the evenness of the coating which that die may impart to the outer surface 52. Experience has shown that it is difficult over such axial distance to maintain precise alignment of the extruded tube so that it cannot be guaranteed that the tube will pass centrally through the secondary die 20 and will thus be doctored evenly by it. Also lacking from the apparatus shown in any of the figures of drawings of U.K. Specification No. 935,535 is the means whereby the rate of flow of the coating material through the apparatus, and hence the mass of material coated upon the tubing in unit time, may be accurately metered. Such metering requires at least for the supply of the material to include a manifold which surrounds the tubing, and for the material to pass from that manifold to the tubing by way of an orifice defined by a rigid structure so that it presents an ascertainable resistance to the flow of material through it and hence creates an ascertainable pressure drop across it. In FIG. 5 of U.K. No. 936,535 there is no such structurally-defined orifice between the annular masses of coating material and the tubing: the masses confront the tubing directly and the subsequent "orifices" through which material passes are defined partly by the tubing itself and not wholly by fixed structure.

In U.S. Pat. No. 2,848,747 a coating is applied in a manner which apparently requires no subsequent secondary die to diminish or improve the evenness of its thickness, but in the process and apparatus described in this specification there is once again a clear separation, measured in a direction parallel to the axis of the extruded tube, between the mouth of the extrusion die and the location at which an operation essential to the formation of the coating is carried out. Such a separation would indeed appear to be essential to the process described in U.S. Pat. No. 2,848,747 where the tube is extruded hot but where the coating is applied by a technique of the kind known as "solvent casting", in which the coating when applied to the tube is dissolved in a solvent that must evaporate when it makes contact with the tube but not before. The viscose dispersion used in U.S. Pat. No. 2,848,747 could well have a boiling point of about 100° C. and would therefore be in danger of premature boiling if it came too close to the mouth of the extrusion die which will typically be at a temperature of the order of say 190° C. The axial separation between the mouth of the extrusion die and the point of application of the coating also leaves the tube free to yield and distort, as in U.K. No. 936,535. The magnitude of this axial separation in U.S. Pat. No. 2,848,747 is illustrated by the fact, clearly indicated in FIG. 1 of the drawings of that specification, that the extruded tube is expected to undergo perceptible radial expansion as it travels through that axial distance. It may also be noted that U.S. Pat. No. 2,848,747 is concerned with a process in which the coated surface layer is quite thick since even after expansion it is capable of being slitted and stripped from its base layer as an independent film. In contrast the present invention is concerned with a process in which the coated layer is thin to begin with and even thinner after expansion, and in which accurate thickness control is therefore vital.

The present invention comprises an improved method, and apparatus for carrying it out, for imparting a surface layer to an extruded film by a coating technique. The invention is defined by the claims, the contents of which form part of the disclosure of this specification. The invention may further be stated to include a method of forming multi-layer, expanded film comprising extruding at least one layer through a die, coating with layer with at least one further layer closely downstream of the die, and then expanding the resulting product. Preferably the material is extruded hot and the coated material is applied at a similar temperature, and the expansion is accompanied by a fall in temperature of the resulting product.

The extrusion may take place through an annular die, facing in an axial direction, so as to form a tubular product, and the coating may be applied by discharging liquid onto at least part of the outer surface of the tube by way of a coating orifice directed radially relative to the same axis. The orifice may be a complete ring if the entire surface is to be coated, or it may be less than complete if only part of the tube surface it to be coated.

The expansion stage of the process may begin directly downstream of the orifice, the downstream wall of which may be relieved in a radial direction so that contact between the orifice surfaces and the deposited coating is soon lost.

The orifice may be defined by an annular unit constructed to fit onto the end of the customary, annular extrusion die so that the die structure provides the upstream defining wall of the coating orifice whereas the unit provides the downstream defining wall including the relieved region already described. Means may be provided to fasten the unit to the die structure and accurately to adjust the relative positions of unit and structure, both axially and radially, so as to control the precise shape of the coating orifice. The coating orifice may be connected to a source of liquid coating material and to means to heat that material to a temperature comparable with that of the material being extruded. The coating material may be urged towards the coating orifice by propulsion means such as a ram, a screw, or gas under pressure.

The invention, which includes the products of the process and apparatus, will now be described by way of example with reference to the accompanying drawings in which.

Figure 1:
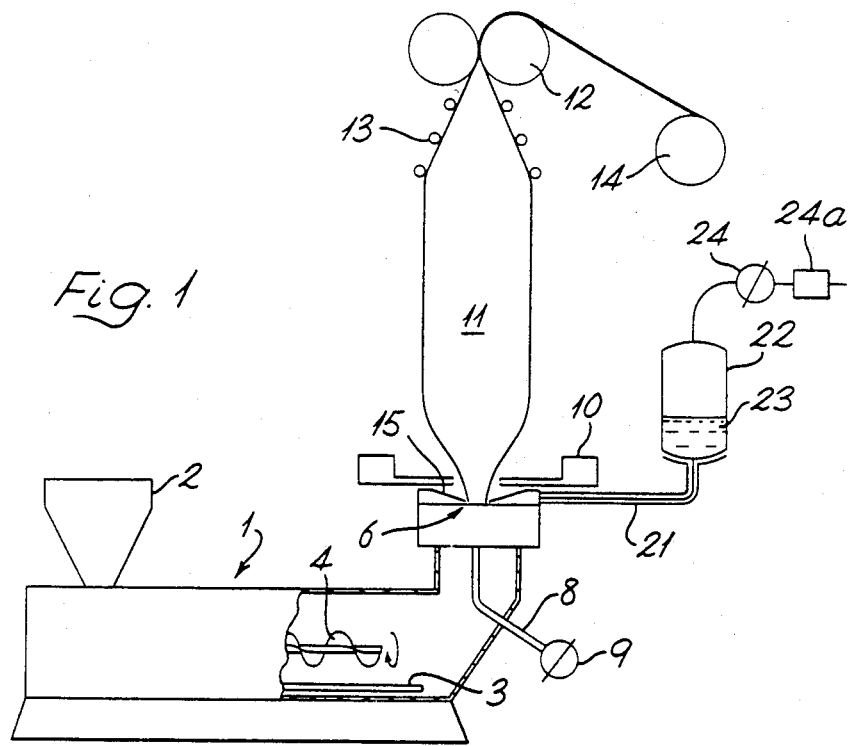
FIG. 1 is a diagrammatic elevation of apparatus for carrying out the present invention.
Figure 2:
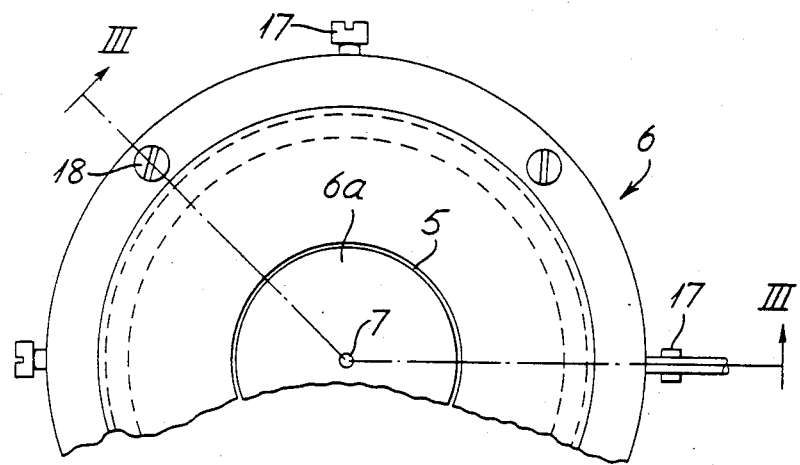
FIG. 2 is a plan view of the extrusion die structure with the coating orifice unit in position.

FIG. 1 shows an extruder 1 comprising an inlet hopper 2, a heater 3 by which the temperature of material fed from the hopper is raised and a screw conveyor 4 by which it is forced towards and extruded through the annular mouth 5 (FIGS. 2 and 3) of a die 6. An opening 7 (FIGS. 2 and 3), located on the axis of the die, communicates by way of a conduit 8 with a pump 9 supplying gas under controlled pressure. Material that is hot-extruded from die 6 is cooled by air blown radially-inwards by a ring nozzle 10, and expanded by a trapped bubble 11 of air with which it is filled by pump 9. The end of the formed tube remote from die 6 is closed by nip rollers 12 into which the tube is conducted by guide rollers 13. Rollers 12 flatten the tube, which is then coiled flat onto a reel 14.

The apparatus features described so far are known, and such as are already used for instance to hot-extrude and expand uncoated polythene film. In one of its forms the invention requires the addition of an orifice unit 15 which fits onto the end of extrusion die unit 6. The two units define between themselves an annular manifold 16, connected by way of a heat exchanger 21 with a reservoir 22 containing coating liquid 23, typically molten polymer. A pressurised gas supply 24 serves to propel the liquid from the reservoir to the manifold by way of the heat exchanger 21, which heats the liquid to substantially the same temperature as that which the extruded product leaves die mouth 5. On the downstream side of manifold 16 the end face 6a of die 6 and the flange 20 of unit 15 constitute the structure defining a metering orifice 19 from which the propelled fluid emerges to meet the outer surface of the extruded tube and form a coating upon it. An "O"-ring seal 15a fits between unit 15 and die 6, and setting screws 17 and 18 enable the exact dimensions of the orifice 19 to be accurately set by allowing both radial and axial adjustment of the relative position of unit 15 and die 6. It is important to the present invention that manifold 16 should permit incoming coating material to distribute itself freely and evenly around the entire annulus, and that during any individual coating operation the dimensions of orifice 19 are constant so that it imposes a constant resistance upon the flow of material through it and thus acts as a true metering orifice, enabling the operator to control the mass of coating imparted in unit time simply by regulating the pressure of supply 24.

Figure 4:
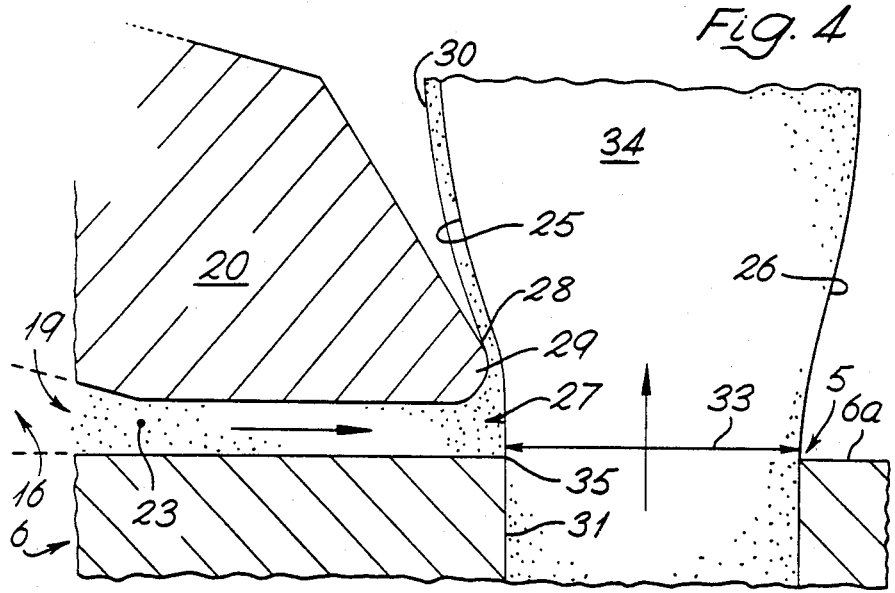
FIG. 4 is a diagrammatic representation of part of the apparatus shown in FIG. 3, in use and on a larger scale.

FIG. 4 illustrates the mechanism by which liquid 23 is coated as an outer layer 30 upon the extruded base film that emerges from die mouth 5. FIG. 4 is on an enlarged scale, and references 25, 26 indicate respectively the outer and inner walls of a layer that may typically be 1 millimeter thick. The nose 29 of flange 20 may advantageously be set back slightly relative to the outer wall 31 of die mouth 5, that is to say it may lie slightly further from the extrusion axis (32, FIG. 2). This feature makes allowance from "die swell", a known phenomenon which causes the thickness of the extruded product to increase—as FIG. 4 clearly shows—immediately on learing the die mouths 5. What is vital to the invention, however, is firstly that the mouth 27 of orifice 19 is located as axially close as is possible to the mouth 5 of die 6, and certainly before the extruded product has been forced to expand to any significant extent by the trapped air bubble 11 (FIG. 1). Secondly that the point (28, FIG. 4) at which the coated further layer 30 leaves contact with the fixed structure of the orifice unit 15 should be separated from the nearest point at which the base film 34 is supported (i.e. the corner 35 of die mouth 5, FIG. 4) by a distance not substantially greater than the width 33 of the base film at that point. At separations greater than this, it is found that the freedom of base film 34 to yield radially as it passes nose 29 soon increases so that the thickness of layer 30 no longer bears a reasonably constant relationship to the feed rate of liquid 23 and thus to the pressure of supply 24.

In one series of tests low density polyethylene film has been extruded as a tube with a wall thickness of 1 millimeter, which has then thinned by a subsequent expansion stage to about 32 micrometers. The applied coating has been of poly (isobutylene), $\overline{M}v=50,000$, and it has been shown that by varying the feed pressure of supply 24 from 20 psig to 60 psig the final thickness of layer 30 after expansion can be varied within the range of about 0.4 to 1.0 micrometers, uniformity of coating thickness varying no more than ±15%. Film has been continuously produced at the rate of 4 kg/hr from an extrusion die (5) of diameter 50 millimeters.

Figure 5:
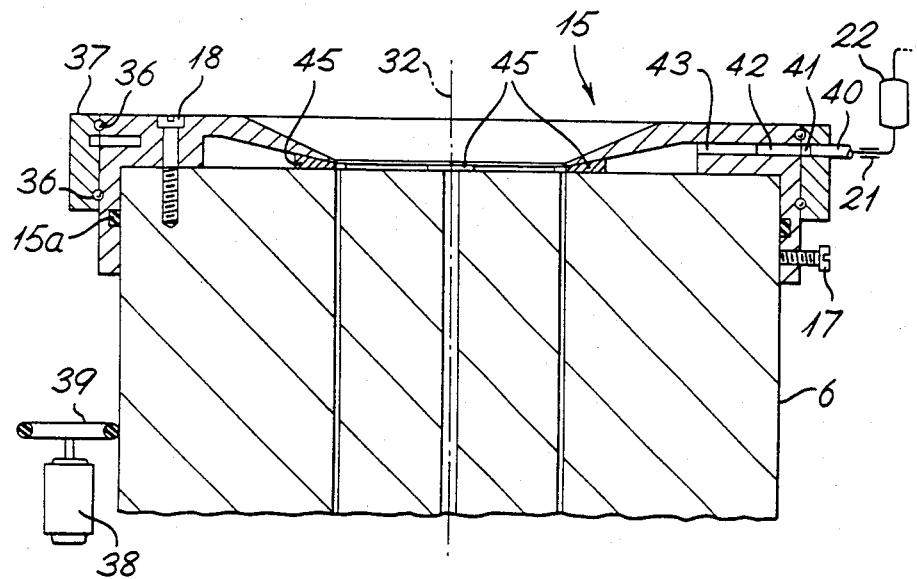
FIG. 5 is an axial section through another apparatus.

FIG. 5 shows a modified apparatus in which the die 6 and attached orifice unit 15 are mounted for rotation, either oscillating or continuous, about extrusion axis 32 while extrusion and subsequent coating proceed. Application of such rotation at slow speeds to conventional dies is known and can help to promote even thickness of the product. For instance, without such rotation an excess width at some point around the mouth of the die can easily result in excess thickness of the part of the product extruded at that point, and so in a bulge when the product is coiled on to a roll. In the apparatus shown in FIG. 5 unit 15 is secured to the die 6 by setting screws 17, 18 as before, but is itself journalled in rotary bearings 36 within a fixed ring 37. A motor 38, driving a tyred wheel 39 which bears against die 6, imparts the desired rotary motion and the coating liquid reaches the orifice 9 by way of a fixed conduit 40. This leads into an annular channel 41 in ring 37, and during the rotary motion channel 41 is constantly in communication with a level annular channel 42 formed in unit 15. A conduit 43 connects channel 42 with manifold 16.

Figure 3:
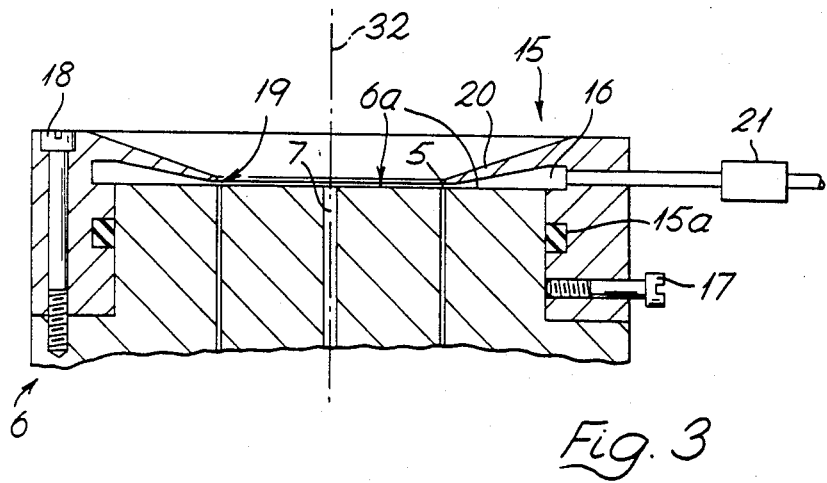
FIG. 3 is a section on the line III—III in FIG. 2.

The mouth 27 of the orifice 19 may be an unobstructed ring, as shown in FIG. 3 for example, but alternatively may be blocked at one or more locations around the periphery (as indicated diagrammatically at 45 in FIG. 5), making possible the production of items in which coatings in the form of spirals or longitudinal wavy strips are imparted to the basic extruded film. An analogous but transverse intermittent effect is obtained, of course, by operating gas supply 24 not continuously but in pulses by means of a control device shown diagrammatically at 24a in FIG. 1, so that the coating liquid 23 emerges from mouth 27 only intermittently. If the mouth is unobstructed the resulting product is a tube carrying discrete longitudinally-separated bands of coating at intervals: such a process has potential in the manufacture, for example, of bags with easy-seal mouths.

Figure 6:
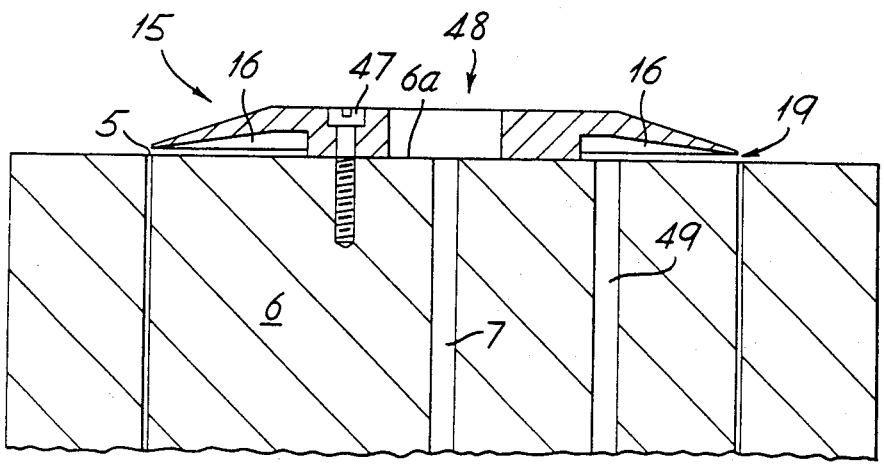
FIG. 6 is an axial section through yet another apparatus.

FIG. 6 shows the essential elements of apparatus by which the invention may be used to impart a coating to the inside, instead of the outside, surface of an extruded tube. Here the orifice unit 15 is secured to the inner part of the die unit 6 by screws 47 and is formed with a central cavity 48 to allow clearance for opening 7. Also orifice 19 now faces radially outwards and coating liquid 23 reaches manifold 16 by way of conduit 49, formed within the structure of die 6. Since that die will usually be hot while extrusion takes place, and since it is often desirable that the liquid issuing from orifice mouth 27 shall be at substantially the same temperature as the extruded film that it is to coat, useful heat-exchange may take place between the die and the coating liquid 23 as the latter passes along conduit 49.

Although it has been described with reference only to the production of expanded, tubular, coated film, the invention is also applicable to the production of flat film or film with an incomplete curved surface, and to the application of the coating to only part of the surface of an extruded product—for instance, to what may become an edge strip if an expanded tube is later longitudinally slit. Such an edge strip may sometimes be sufficient to give a self-wrapping capability to a film which is otherwise uncoated and is thus cheaper than a wholly-coated film. Furthermore, while the invention has been described in relation only to the coating of a single layer upon a base film consisting of a single extruded layer, the invention applies also to processes in which layers are coated upon a base film comprising an extruded layer which already carries one or more coated layers. Apparatus for carrying out such a process may, for instance, comprise an extrusion die mouth followed by a series of coating orifices located closely one after the other. In such a case, the "base film" for each individual coating operation is the product of the last preceding such operation.

We claim:

1. Apparatus for forming multi-layer film comprising an extrusion die defining an extrusion axis and presenting a die mouth;
   means including said extrusion die for forming a base film comprising at least one extruded layer, said die mouth having a width dimension determining the thickness of said extruded layer upon leaving said extrusion die;
   a manifold;
   a metering orifice surrounding said extrusion axis;
   means to propel fluid through said manifold and said metering orifice in succession to meet a surface of said base film at a first location closely downstream of said extrusion die before any substantial degree of expansion has taken place and so to coat a further layer upon it, said metering orifice including a defining structure presenting a surface region at which said fluid leaves contact with said defining structure in the course of forming said coating further layer;
   said surface region being at a second location separated from said die mouth by a first linear dimension, measured parallel to said extrusion axis, that is not substantially greater than said width dimension with a space being provided substantially immediately downstream of said second location and without any solid restraining structure, in which said resulting multi-layer film is free to expand; and
   means subsequently to expand said resulting multi-layer film.

2. Apparatus according to claim 1 in which the upstream edge of said metering orifice is defined by an end face said extrusion die itself, and comprising a unit fixed to said extrusion die and defining the downstream edge of said metering orifice.

3. Apparatus according to claim 2 in which said unit is adjustably fixed to said extrusion die, whereby the dimensions of said metering orifice may be varied.

4. Apparatus according to claim 2 in which said extrusion die is adapted to extrude at least one layer of tubular form and in which said unit is an annular structure cooperating with said extrusion die to present an annular said metering orifice, facing radially relative to the axis of said extrusion.

5. Apparatus according to claim 4 mounted for rotary movement about said extrusion axis.

6. Apparatus according to claim 2 in which the distance of said downstream edge of said metering orifice from the axis of said extrusion is slightly greater than the distance from said axis of the outer boundary of the mouth of said extrusion die itself, to allow for "swell" of said at least one extruded layer immediately upon leaving the said die.

7. Apparatus according to claim 1 including:
a reservoir suitable for said liquid and connected to said manifold;
means to propel said liquid from said reservoir to said manifold; and
means for heating said liquid so that the temperatures of said extruded and coated layers are substantially equal when said at least one further coated layer is applied.

8. Apparatus according to claim 1 in which said metering orifice is of lesser extent than the mouth of said extrusion die, whereby said at least one further coated layer is confined to a longitudinal strip of said base film.

9. Apparatus according to claim 7 including mechanism to operate liquid propulsion means intermittently, whereby said at least one further coated layer is confined to longitudinally separated bands of said base film.

10. Apparatus according to claim 1 in which:
a second linear dimension, measured radially in a radial plane relative to said extrusion axis, separates said surface region from said first location; and
said second linear dimension is not substantially greater than the thickness of said base film measured in the said radial plane.

* * * * *